(12) United States Patent
Le Du et al.

(10) Patent No.: US 11,524,849 B2
(45) Date of Patent: Dec. 13, 2022

(54) TRANSFER DEVICE FOR CONVEYOR

(71) Applicant: FIVES SYLEPS, Lorient (FR)

(72) Inventors: Pierre Le Du, Lorient (FR); Pierre Le Coguic, Lorient (FR); Pascal Perrot, Lorient (FR)

(73) Assignee: FIVES SYLEPS, Lorient (FR)

( * ) Notice: Subject to any disclaimer, the term of this patent is extended or adjusted under 35 U.S.C. 154(b) by 0 days.

(21) Appl. No.: 17/282,701

(22) PCT Filed: Oct. 4, 2019

(86) PCT No.: PCT/EP2019/076962
§ 371 (c)(1),
(2) Date: Apr. 2, 2021

(87) PCT Pub. No.: WO2020/070310
PCT Pub. Date: Apr. 9, 2020

(65) Prior Publication Data
US 2021/0387813 A1   Dec. 16, 2021

(30) Foreign Application Priority Data

Oct. 5, 2018 (FR) ..................................... 18 59264

(51) Int. Cl.
*B65G 47/54* (2006.01)
*B65G 39/04* (2006.01)
*B65G 47/244* (2006.01)

(52) U.S. Cl.
CPC ............. *B65G 47/54* (2013.01); *B65G 39/04* (2013.01); *B65G 47/244* (2013.01)

(58) Field of Classification Search
CPC ....... B65G 39/04; B65G 47/54; B65G 47/244
(Continued)

(56) References Cited

U.S. PATENT DOCUMENTS 2,016,700 A * 10/1935 Anderson ............ B65G 13/071
198/787
3,026,993 A *  3/1962 Penn ...................... B65G 13/07
198/787

(Continued)

FOREIGN PATENT DOCUMENTS

EP     0 244 805     11/1987
EP     0 287 171     10/1988
(Continued)

OTHER PUBLICATIONS

US 2010/0200372 A1, Krups et al., Aug. 12, 2010.*
(Continued)

*Primary Examiner* — Douglas A Hess
(74) *Attorney, Agent, or Firm* — Nixon & Vanderhye

(57) ABSTRACT

Disclosed is an object transfer device for a conveying installation, the device including a main object conveying path and a plurality of rotary drive elements, the rotary elements being configured to adopt a lowered position in which the element is situated below the main path a raised position in which the element projects above the main path in order to drive an object, the rotary drive element including drive surfaces with external diameters that vary over the length of the element, wherein the drive surfaces of the rotary drive elements have an external diameter that varies according to the angular position of the rotary element along the transfer path. Also disclosed is a conveying installation including such transfer device.

20 Claims, 3 Drawing Sheets

(58) Field of Classification Search
USPC .................................................. 198/413, 787
See application file for complete search history.

(56) References Cited

U.S. PATENT DOCUMENTS

| | | | | | |
|---|---|---|---|---|---|
| 3,269,519 | A | * | 8/1966 | De Good | B65G 47/54 198/525 |
| 3,926,298 | A | * | 12/1975 | Miller | B65G 47/54 198/370.1 |
| 4,598,815 | A | * | 7/1986 | Adama | B65G 47/54 198/782 |
| 4,759,434 | A | * | 7/1988 | Dorner | B65G 47/54 198/787 |
| 5,107,982 | A | * | 4/1992 | Walter | B65G 13/071 198/781.04 |
| 5,145,049 | A | * | 9/1992 | McClurkin | B65G 47/086 198/374 |
| 6,179,113 | B1 | * | 1/2001 | Wunscher | B65G 13/10 198/782 |
| 6,523,665 | B2 | * | 2/2003 | Nimmo | B65G 39/07 193/35 R |
| 7,299,909 | B1 | * | 11/2007 | Houghton | B65G 39/07 193/35 R |
| 9,181,032 | B2 | * | 11/2015 | Wolters | B65G 13/071 |
| 10,941,004 | B2 | * | 3/2021 | Karol | B65G 39/18 |

FOREIGN PATENT DOCUMENTS

| | | |
|---|---|---|
| FR | 1 405 849 | 7/1965 |
| JP | S62-59640 | 4/1987 |
| JP | H04-101912 | 4/1992 |
| JP | H04-66116 | 6/1992 |

OTHER PUBLICATIONS

International Search Report for PCT/EP2019/076962 dated Dec. 6, 2019, 7 pages.
Written Opinion of the ISA for PCT/EP2019/076962 dated Dec. 6, 2019, 6 pages.
FR Search Report for FR 1859264 dated Jun. 14, 2019, 2 pages.

* cited by examiner

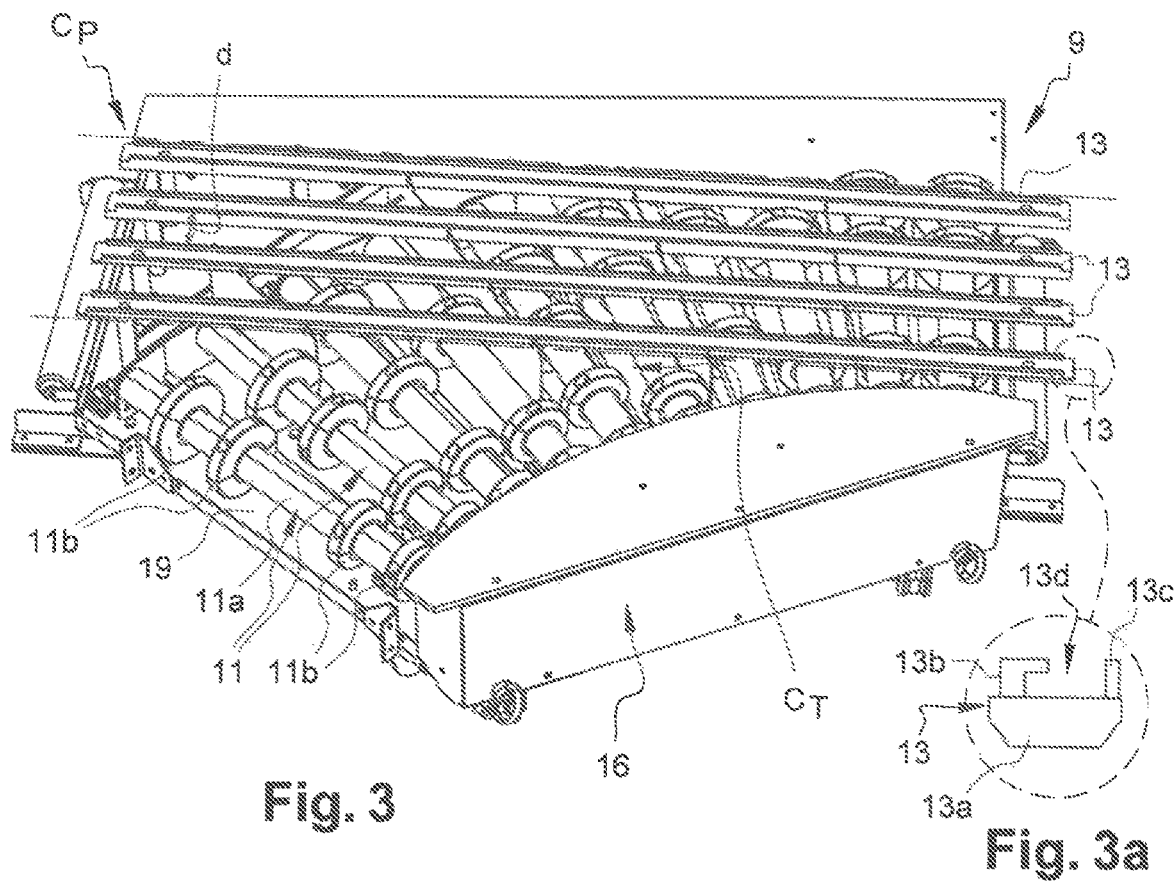
Fig. 3
Fig. 3a
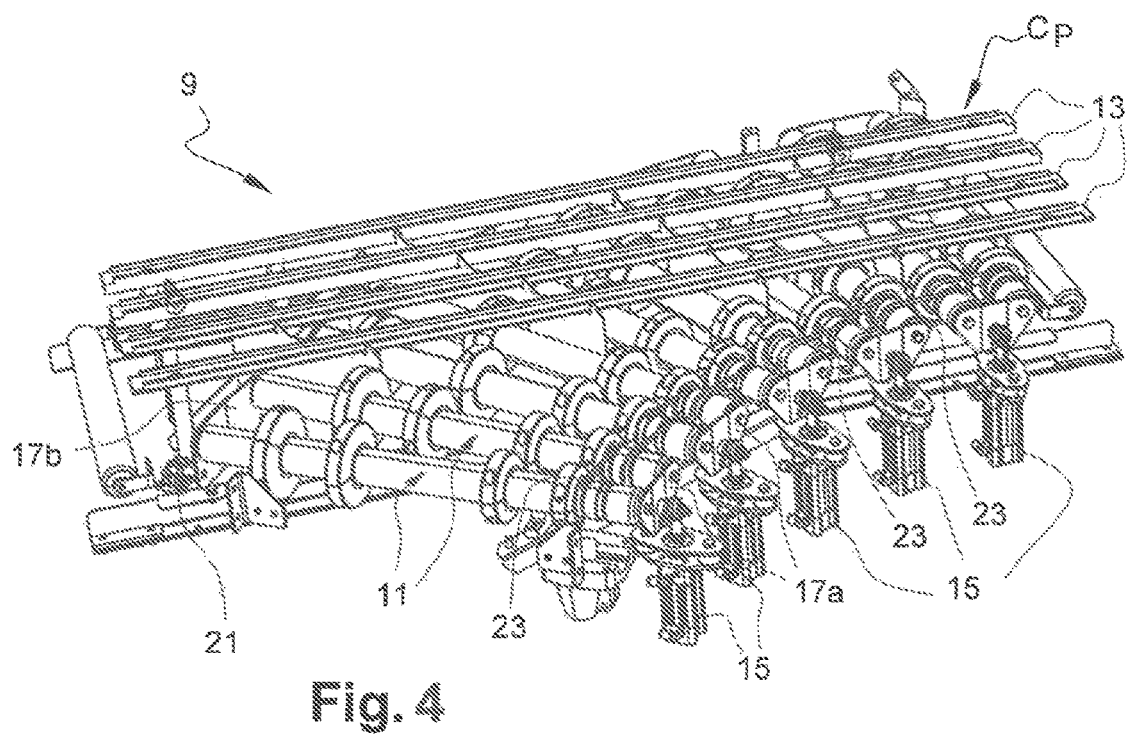
Fig. 4 ial Application No. PCT/EP2019/076962 filed Oct. 4, 2019 which designated the U.S. and claims priority to FR 18 59264 filed Oct. 5, 2018, the entire contents of each of which are hereby incorporated by reference.

BACKGROUND OF THE INVENTION

Field of the Invention

The present invention relates generally to the field of installations for conveying objects, also commonly called conveyors. More particularly, the present invention relates to the transfer of objects from or to a conveyor, that is, the collection (or insertion) or sorting of objects (it should be noted that for the collection function, one can also speak of convergence of the flows of objects to be conveyed).

Description of the Related Art

One or more conveyors are arranged in order to define a main conveying path which has collection and/or sorting lanes. More particularly, the main conveying path, on which a flow of objects circulates, has branches which allow respectively, to insert objects in the flow of objects circulating on the main path (we speak then of collection), and/or to sort (that is extract) an object from the flow of objects circulating on the main path.

At present, it is necessary to have two different devices for collecting and sorting an object with respect to the flow of objects circulating on the main conveying path.

Thus, for the collection of an object on the main path, a cylindrical roller conveyor is generally used, which is arranged obliquely to the main conveying path. The insertion (or collection) point on the main conveyor path is usually formed by a conveyor belt.

The problems related to this type of collection device are that the speed of the conveyor belt must be moderate (for example with a flow rate of the order of 2000 objects per hour for objects with an unstable equilibrium) and the distance between two consecutive objects on the main path must be sufficiently large for collection to take place under good conditions, that is, without collisions with other objects or conveyor components, or any other problem leading to the stopping of the conveyor (rotation of the object, fall of the object, accumulation of objects leading to the creation of a blockage, etc.).

Unstable equilibrium objects are objects with non-parallelepiped shapes, high centers of gravity (that is, at a distance from the base of the object), high length-to-width ratios (e.g., greater than 3), and/or non-flat bottoms (such as petaloid bottoms), thus causing instability of objects during their movement (e.g., water bottles are unstable equilibrium objects).

With regard to the sorting of an object circulating on the main conveyor path, the sorting device (commonly called a sorter) is a set of rotary elements arranged underneath and set back from the conveyor path, which is itself made up of discrete conveyor elements spaced from each other, such as belts or rollers. These rotary elements, which allow an object to be extracted from the flow of objects on the main path, are thus oriented towards an exit branch to sort the object. Thus, when an object to be sorted comes into contact with the set of rotary elements, the set of rotary elements rises, through the conveying elements, to come into contact with the object (thus uncoupling the object from the conveying elements of the main path) and drive the object in the direction of the branch intended for sorting.

One of the disadvantages of this type of sorting device is that the rotary elements are configured to apply identical forces, regardless of their position, to the object to be sorted. This generally results in an undesirable and unpredictable displacement of the object in relation to the main path, for example the rotation of the object on itself, or even their tilting, for certain types of object. These uncontrolled behaviors are not acceptable because they can disrupt or even stop the flow of objects circulating on the main conveyor path.

It should also be noted that the sorting devices of the prior art do not allow for exceeding a flow of 3000 unstable equilibrium objects per hour.

SUMMARY OF THE INVENTION

Thus, the present invention aims to remedy at least one of the above-mentioned disadvantages and to propose a new type of object transfer device for a conveying installation, said device comprising a main conveying path for one or more objects and a plurality of rotary drive elements, said rotary elements being configured to adopt at least two positions:
 a lowered position in which said element is located below (or set back from) the main conveying path and does not drive an object;
 a raised position in which said element projects above the main conveying path to drive an object;
 characterized in that a rotary drive element has drive surfaces with varying external diameters along the length of the element (also referred to as varying diameter or cross-section along its length).

The transfer device allows for conveying an object at high throughput rates, for example for throughput rates of more than 7000 objects/hour, this for objects with an unstable equilibrium. Furthermore, two devices according to the invention can be used in a conveying installation, one for collecting, the other for sorting objects.

According to one possible feature, the plurality of rotary drive elements defines a curved (or rounded) transfer path, followed by an object.

Indeed, it is advantageous that the drive path defined by the rotary drive elements has a certain curvature. An object, for example with an unstable equilibrium, when it follows a curved trajectory (for example circular, elliptical or parabolic . . . ) during its collection or sorting is less prone to overturn, because the path allows a progressive deviation, while minimizing the instantaneous forces to be applied to the object to deflect it. It will be noted, moreover, that for a curved shaped transfer path it is thus possible to define one or more centers of curvature, which are virtual points whose distance from the trajectory of the deviated object corresponds to a given radius of curvature.

According to another possible feature, the outer diameter of the drive surfaces of at least one rotary element increases as a function of the distance from the center of curvature of said transfer path.

Varying the outer diameter of the drive surfaces of a rotary drive element (which corresponds to the contact area between the rotary element and the object to be transferred) according to the distance from the center of curvature allows for a greater speed of the drive element toward the outside of the transfer path than toward the inside thereof. In this way, the drive forces applied to the transferred object are as homogeneous as possible, thus preventing it from turning on itself or tilting when an unstable equilibrium object is present.

According to another possible feature, the drive surfaces of the rotary drive elements have an external diameter that varies according to the angular position of said rotary element on the transfer path (we can also speak of an angle-dependent variable section).

This variation of the diameter of the drive surfaces of the rotary elements according to the angle makes it possible, among other things, to induce a progressive acceleration and deceleration of the transferred object so that the latter undergoes as little effort as possible causing tilting or rotation of the object on itself.

According to an optional feature, a rotary drive element comprising a plurality of rollers mounted on a roller, the diameter of said rollers varies according to the angular position of each roller with respect to the transfer path.

According to an optional feature, for the rollers located outside of an average path, substantially in the middle of the rollers, the diameter of said rollers increases from 0° to $\beta/2$ and then decreases from $\beta/2$ to $\beta$. Conversely, for rollers located inside this middle path, the diameter of said rollers decreases from 0° to $\beta/2$ and then increases from $\beta/2$ to $\beta$.

According to another possible feature, the rotary drive elements move from a lowered position to a raised position, in succession, the rotary element being in the raised position when the object to be driven is located opposite said element.

It should be noted that the rotary drive elements may be raised and lowered as a unit in order to transfer an object. However, it is particularly advantageous that one or more rotary elements, for example in pairs, may be raised or lowered independently of each other.

Indeed, in the case of an object insertion (or collection), if all the rotary elements rise and fall during the insertion of an object between two consecutive objects circulating on the main conveying path, the distance between the two objects must be greater than the length of the transfer path so as not to disturb the flow of objects circulating on said main conveying path. Otherwise, the rotary elements would be in contact with objects that we do not want to deviate (or transfer) and would disrupt the flow of objects on the main path.

Thus, the fact that the rotary drive elements can be raised and lowered, for example in pairs, reduces the distance required between two consecutive objects to allow the insertion of a new object between them. In addition, this allows for faster insertion of objects on the main conveyor path by reducing the minimum distance between two consecutive inserted objects.

The reasoning applies analogously to the sorting of an object, the device according to the invention enabling a reduction in the minimum distance between the objects circulating on the main conveying path for their sorting. It will be noted that a transfer step can thus be defined which corresponds to the minimum distance between objects travelling on the main path and which corresponds to the number of rotary drive elements configured to rise and/or fall independently. Thus, the transfer step will be substantially equal to or greater than the transverse dimension of a rotary element or the plurality of rotary elements capable of successive raising and lowering.

According to another possible feature, said transfer device includes a sensor for detecting the presence of objects on said device.

According to another possible feature, the drive surfaces of a rotary drive element are discontinuous (that is, the whole of a rotary element does not contact the object to be moved, but only specific areas of said element).

In order not to impede the conveying of objects on the main path, the rotary drive elements have specific drive surfaces distributed along the main conveying path (e.g., on both sides and/or within said path).

Furthermore, this avoids interrupting the conveying path when interposing a device according to the invention.

According to another possible feature, the device according to the invention comprises at least one sensor configured to determine an extension dimension of the object to be transferred and/or the distance between two consecutive objects running on the main conveying path, said determined extension dimension extending along the conveying direction of the object.

It should be noted that "extension dimension" is understood as the extension dimension of the object substantially parallel to the direction of travel (or conveying) of the objects on the main conveying or transfer path.

The sensor allows for optimizing the collection or sorting of objects of different sizes by minimizing the distance between consecutive objects and thus optimizing the occupation of the space available on the main path for conveying the objects.

According to another possible feature, the device comprises a sensor configured to determine the distance between two consecutive objects travelling on the main conveying path.

According to another possible feature, the sensor is configured to determine the overall dimensions of the objects to be transferred (whether for objects to be collected or sorted).

According to another possible feature, the main conveyor path comprises discrete drive elements, such as drive belts.

The fact that the main conveying path comprises discrete drive elements allows the rotary drive elements to be distributed over the transverse extension of the object to be transferred ("transverse extension" is understood as the dimension of the object substantially orthogonal to the direction of travel of the objects on the main conveying path).

According to another possible feature, the main conveying path comprises includes slides suitable for receiving a drive belt.

When the drive elements of the main conveyor path are discrete, such as belts, a slide enables the drive belt to guided and prevent the belt from shifting transversely, which would result in changing the path of an object on the main conveyor path and/or the object being transferred.

According to another possible feature, said slides are made of a flexible material. The advantage of having slides made of a flexible material, such as polymers, plastics, etc., allows for better safety of the operators in the vicinity of the device according to the invention. Indeed, in the event that an operator gets his finger or hand caught by the drive elements, the flexibility of the slide allows him/her to remove his/her finger or hand provided that he/she applies sufficient effort to deform the slides.

According to another possible feature, one or more rotary drive elements comprise at least one roller and one or more rollers mounted on said roller.

Having a single drive roller with one or more rollers mounted thereon reduces the number of motors and/or connecting elements between said rotary drive elements.

According to another possible feature, the device according to the invention comprises at least one actuator configured to raise and/or lower at least one rotary drive element.

The invention also relates to an installation for conveying objects, said installation comprising at least two conveyors and a transfer device as described above. Said transfer device is interposed between said at least two conveyors, thus defining at least one main conveying path and at least one transfer path.

BRIEF DESCRIPTION OF THE DRAWINGS

The invention will be better understood, and other purposes, details, features and advantages thereof will become clearer in the course of the following description of a particular embodiment of the invention, given solely by way of illustration and not limitative, with reference to the appended drawings, in which:

FIG. 3 shows a schematic perspective view of a transfer device of FIG. 1;

FIG. 3a is an enlarged cross-sectional view of a slide of the device of FIG. 3;

FIG. 4 is an extracted view of FIG. 3 in which the actuators of the drive elements have been highlighted;

DESCRIPTION OF THE PREFERRED EMBODIMENTS

Figure 1:
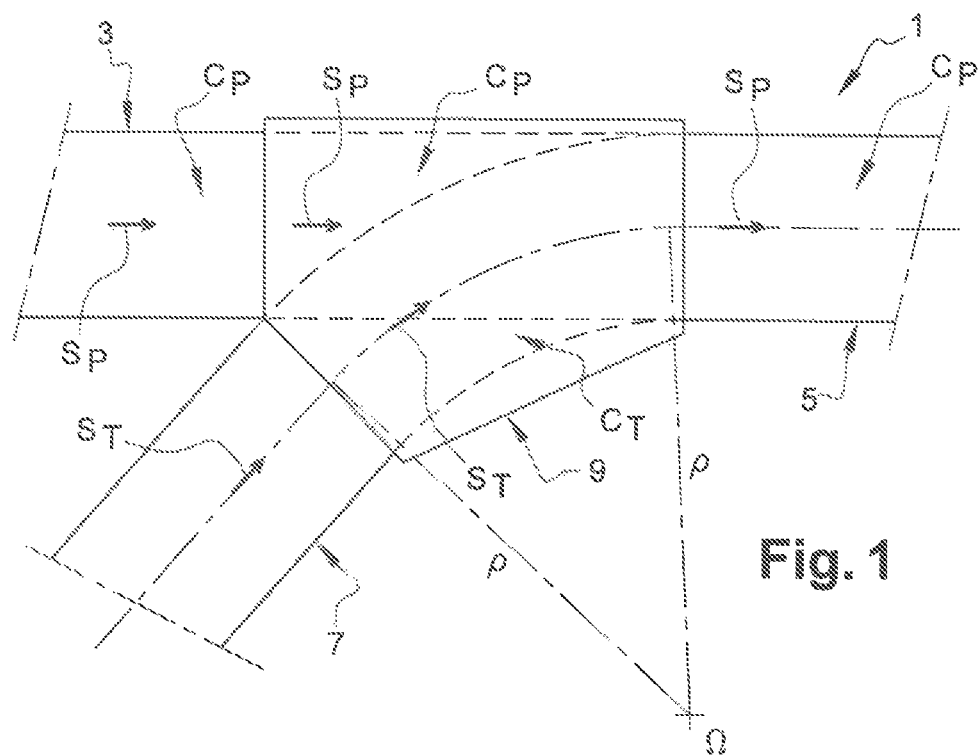
FIG. 1 shows a very schematic view, from above, of a portion of a installation for conveying objects comprising a transfer device according to the invention according to a first use (as a collector)

FIG. 1 shows a very schematic view, from above, of a portion of an installation 1 for conveying objects that includes three conveyors 3, 5 and 7, as well as a transfer device 9 according to the invention. FIG. 1 shows a first possible use of the transfer device 9 according to the invention, that is, when the latter is used as a collector or collection device for objects in a conveying installation 1.

More particularly, the installation 1 comprises an upstream conveyor 3 arranged upstream of the device 9, a downstream conveyor 5 arranged downstream of the device 9 and a collection conveyor 7 also arranged upstream of said device 9.

The upstream conveyor 3, the downstream conveyor 5 and the transfer device 9 define a main path $C_P$ for conveying objects, on which a flow of objects circulates in a direction $S_P$. The transfer device 9 also defines a transfer path $C_T$. Thus, when an object is inserted in a direction $S_T$, by the collection conveyor 7, the object joins the main path $C_P$ via the transfer path $C_T$ (provided that the device 9 is activated).

Figure 2:
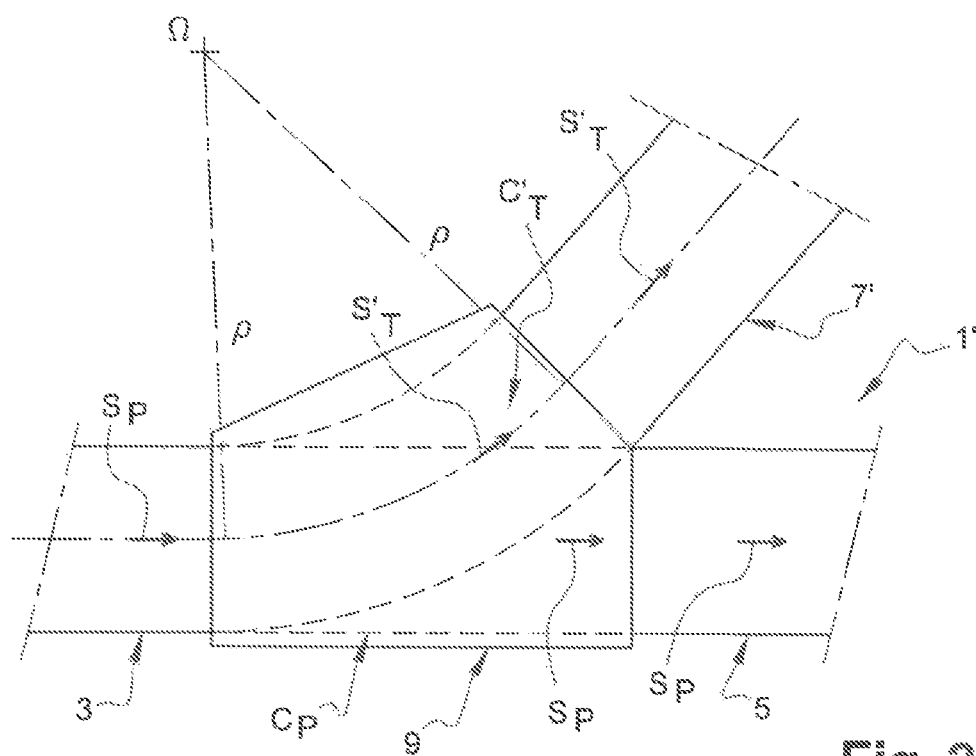
FIG. 2 shows a very schematic view, from above, of a portion of a installation for conveying objects comprising a transfer device according to the invention according to a second use (as a sorter)

FIG. 2 shows a conveying installation 1' in which the transfer device 9 is used as a sorter. It should be noted that the same references are used hereafter to designate objects similar to those in FIG. 1.

Thus, the conveying installation 1' comprises an upstream conveyor 3 arranged upstream of the device 9, a downstream conveyor 5 arranged downstream of the device 9 and a sorting conveyor 7' arranged downstream of said device 9.

Thus, the upstream conveyor 3, the downstream conveyor 5 and the transfer device 9 define a main path $C_P$ for conveying objects, on which a flow of objects circulates in a direction $S_P$.

More particularly, the said device 9 (when it is activated) enables the extraction (or to sorting) of an object circulating on the main conveyor path $C_P$ and the transfer (or to diverting) of it in the direction of the sorting conveyor 7' (by means of an exit ramp), this by making it follow a transfer path $C_T'$.

A flow of objects circulates in a direction $S_P$ along the main path $C_P$ (from the upstream conveyor 3 towards the downstream conveyor 5), while the objects transferred towards the sorting conveyor 7', follow the transfer path $C_T'$, in a direction $S_T'$.

Thus, whatever the use of the transfer device 9, the transfer path $C_T$ or $C_T'$ has a substantially curved shape. In this way, the transferred object follows a trajectory that is also substantially curved. The transfer path and/or the trajectory of the object can be circular, elliptical, parabolic, etc.

It is possible to characterize the transfer path $C_T$ or $C_T'$ by one or more radii of the curvature $\rho$ and centers of the curvature $\Omega$. The one or more radii of the curvature $\rho$ are, for example, between 900 and 1300 mm.

Furthermore, in an embodiment not described, it is particularly advantageous to have a transfer path with two successive radii of curvature $\rho1$ and $\rho2$, with the respective centers of curvature $\Omega1$ and $\Omega2$, in which $\rho1$ is less than $\rho2$. The object that travels along said transfer path $C_T$ or $C_T'$ thus follows a trajectory defined first by $\rho1$ and then by $\rho2$.

Furthermore, it will be noted that the upstream conveyor 3 and the downstream conveyor 5 may be a single conveyor (or conveying installation) arranged to receive the transfer device 9.

FIG. 3 shows a schematic perspective and top view of a transfer device 9 according to the invention.

More particularly, the transfer device 9 comprises:
at least a portion of the main conveying path $C_P$ configured for a flow of objects to travel along;
a plurality of rotary drive elements 11 that define the transfer path $C_T$ (or detour path). Said plurality of rotary drive elements 11 are configured to drive an object contacting said elements 11, that is, the rotation of said elements 11 enables a movement be conveyed, by mechanical contact, to the objects to be transferred. More particularly, said rotary elements 11 include drive surfaces that are the surfaces contacting the object and enabling it to be moved.

It will be noted that the main path $C_P$ is substantially a plane, the flow of conveyed objects moving on the surface of said plane.

The rotary elements 11 are configured to adopt at least two positions:
a lowered position in which the elements 11 are located below the main conveying path $C_P$ (thus below the plane);
a raised positioning which the elements 11 project above the main conveying path $C_P$ (thus above the plane) to transfer an object.

Thus, when the elements 11 project above the conveying path $C_P$, the objects conveyed on the main path $C_P$ are thus deviated (or transferred) by the elements 11 and then follow the transfer path $C_T$ or $C_T'$.

This deviation of the objects enables either the sorting or the collection of an object, depending on the use of the transfer device 9 (as well as its position) in a conveying installation 1.

The transfer device 9 also comprises a plurality of slides 13 adapted to each accommodate a drive belt (not shown). The drive belts enable the objects to be conveyed along the main path $C_P$ (or at least part of said main path). It should be noted that the drive belts may be included in the transfer device 9, but may also be an element of the upstream conveyors 3 and/or downstream conveyors 5.

The slides 13 are discrete elements separated from each other by a distance d. Said slides 13 are made of a flexible material, such as plastic or a polymeric material.

More particularly, FIG. 3a shows a schematic and enlarged cross section view of a slide 13. The slide 13 made in one piece, for example, includes a base 13a from which two walls 13b and 13c project. The base 13a and the walls 13b and 13c thus define a housing 13d for a drive belt. It should be noted that said walls 13b and 13c also have the function of limiting the lateral displacement of the drive belt.

Furthermore, one of the walls 13b defining the housing 13d comprises a return located on the upper part of the wall 13b and oriented towards said housing 13d. This particular shape (substantially square-shaped) makes it possible to limit the risks of the belt being "unseated", that is, the belt coming out of the housing 13d, for example, following a collision between objects or the deformation of an object (such as a cardboard).

It should be noted that it is advantageous for the rotary drive elements 11 to have drive surfaces having varying external diameters along their length (one can also speak of sections varying along their length).

Thus, in the embodiment shown in FIG. 3, a rotary element 11 comprises a roll 11a of cylindrical shape, for example, and one or more rollers 11b mounted on said roll 11a. The rollers 11b are the areas that come into contact with the object when the rotary element 11 is in the up position, so the object/rotary element 11 contact is discrete. The rollers 11b thus define the drive surfaces of the rotary element 11, said drive surfaces being discontinuous.

Furthermore, it is particularly advantageous for the diameter of the rollers to vary according to the position of the roller 11b on the roll 11a, since the peripheral speed (that is, the driving speed) of the roller increases as the diameter of the roller 11b increases. More particularly, by positioning the rollers 11b that have a diameter that increases as a function of the distance from the center of curvature Ω of said transfer path $C_T$ or $C_T'$.

The rollers 11b are mounted on the roll 11a in such a way that they do not come into contact with the slides 13 when the rotary drive elements 11 are in the raised position.

In an embodiment not shown, the roll of the rotary elements is tapered and includes substantially identical rollers; the taper of the roller in association with the rollers leads to a variation in the outer diameter of the drive surfaces of the rotary element. More particularly, the outer diameter of the drive surface of the rotary element increases as a function of the distance from the center of curvature Ω of the transfer path $C_T$ or $C_T'$.

Thus, regardless of the embodiment, the rotary drive elements 11 have specific drive surfaces distributed at the level of the main conveying path $C_P$, which may be on either side of the main path $C_P$ (e.g., by framing said path) and/or within said main path $C_P$. The rollers 11b, in the raised position, are flush above the conveying surface of the main path $C_P$, for example between the slides 13.

Furthermore, the transfer device 9 also comprises one or more actuators 15 configured to raise and lower one or more rotary drive elements 11.

The actuator(s), such as cylinders, may be hydraulic, electric, etc.

Said actuators 15 are more particularly visible in FIG. 4, which is an extracted view of FIG. 3 in which a casing 16 housing the actuators 15 has been omitted.

In the embodiment shown, an actuator 15 enables the raising or lowering of two consecutive rotary elements 11.

Nevertheless, it should be noted that an actuator 15 can raise and lower any number of rotary elements (from 1 to n, where n is a natural number greater than 1).

In the present case, the device 9 comprises connecting pieces 17a and 17b connecting the opposite ends of two consecutive rotary elements 11.

Thus, the ends, closest to the center of curvature Ω, of two rotary elements 11 are connected by a first connecting piece 17a that is itself connected to an actuator 15. The opposite ends, that is, the ends farthest from center of curvature Ω, are, in turn, connected to each other by a second connecting piece 17b. Said second connecting piece 17b is attached to a support structure 19 via a hinge 21. Thus, under the effect of an actuator 15, the first connecting part 17a is lifted (that is moved in the direction of the conveyor path), also causing, via the hinge 21, the displacement of the second connecting part 17b. This results in the movement of two rotary elements 11 from a lowered to a raised position and vice versa. The actuator 15, the connecting parts 17a and 17b, and the hinge 21 enable the rotary elements 11 to translate from one substantially horizontal plane to another.

Furthermore, the rotary elements 11 are driven in rotation by a motor. In the embodiment described in FIG. 3, one of the rotary elements 11 is motorized, that is, it includes inside the roll 11a, for example, a motor configured to rotate said roll 11a about its axis of revolution.

In general, only some of the rotary elements 11 are motorized and the device 9 comprises transmission belts 23 connecting the roll 11a of said elements 11 to each other, in this way the motorized rotary element 11 rotates the other rotary elements 11 through the transmission belts 23.

Preferably, the rotary elements 11 are connected from close to each other by means of transmission belts 23.

Furthermore, the transmission belts 23 are advantageously elastic, in order to tolerate the variation in distance between the rotary elements 11 when these are raised and lowered (more particularly, when two rotary elements 11 connected by a belt are in different positions).

In order to optimize the flow of conveyed and diverted objects, whether for collecting or sorting, each of the actuators 15 is configured to independently move at least two rotary drive elements 11 in a successive and independent manner. The rotary elements 11 are in the raised position when the object to be transferred is located opposite the said elements 11, once the object has been deflected by the elements 11, the latter return to the lowered position so as not to interfere with other objects circulating on the main conveying path $C_P$.

Thus, in this embodiment, it can be seen that two rotary elements 11 connected by connecting parts 17a and 17b define a transfer step that corresponds to the minimum distance between objects circulating on the main path that can be deviated without disturbing the flow of objects on the main path.

Naturally, according to the nature of the objects (dimensions, weight, etc.) and the desired object flow rates, the number of linked rotary elements 11 capable of independent raising and/or lowering may vary. More particularly, the transfer step is substantially equal to the transverse dimension of a rotary element 11 or set of rotary elements 11 capable of successive raising and lowering.

In an alternative embodiment not shown, the transfer device according to the invention comprises at least one sensor configured to determine one or more extension dimensions of the object to be transferred and/or the distance between two consecutive objects travelling on the main conveying path OP.

The most relevant extension dimension to be determined, when inserting an object, is the dimension of the object that extends along the conveying direction of the object. However, the sensor or sensors can also be configured to determine other dimensions of the object, whether the objects running on the collection conveyor 7, the downstream conveyor 3 and/or the transfer device 9.

The sensor or sensors are connected to the actuators, either directly or indirectly by an electronic entity, and enable the distance between consecutive objects running on the main conveyor path to be minimized, to optimize the collection and/or sorting of objects. The transfer device 9 can therefore operate with a minimal transfer step and thus enable a greater flow of objects on the main conveying path. It should be noted that the sensor(s) described above may be positioned on the transfer device 9, the upstream conveyors 3 and/or the collection conveyors 7 of the conveying installation 1. The said sensors are, for example, cameras, optical readers in cooperation with a barcode, etc.

In one alternative embodiment, the outer diameter of the drive surfaces of a rotary element 11 varies as a function of the angular position of said element 11 with respect to the transfer path $C_T$ (or $C_T'$, depending on the use of the device according to the invention) defined by a plurality of rotary elements 11.

It is, for example, the diameter of the rollers 11b of a rotary element 11 that varies as a function of the angular position of each roller 11b relative to the transfer path $C_T$ or $C_T'$.

Figure 5:
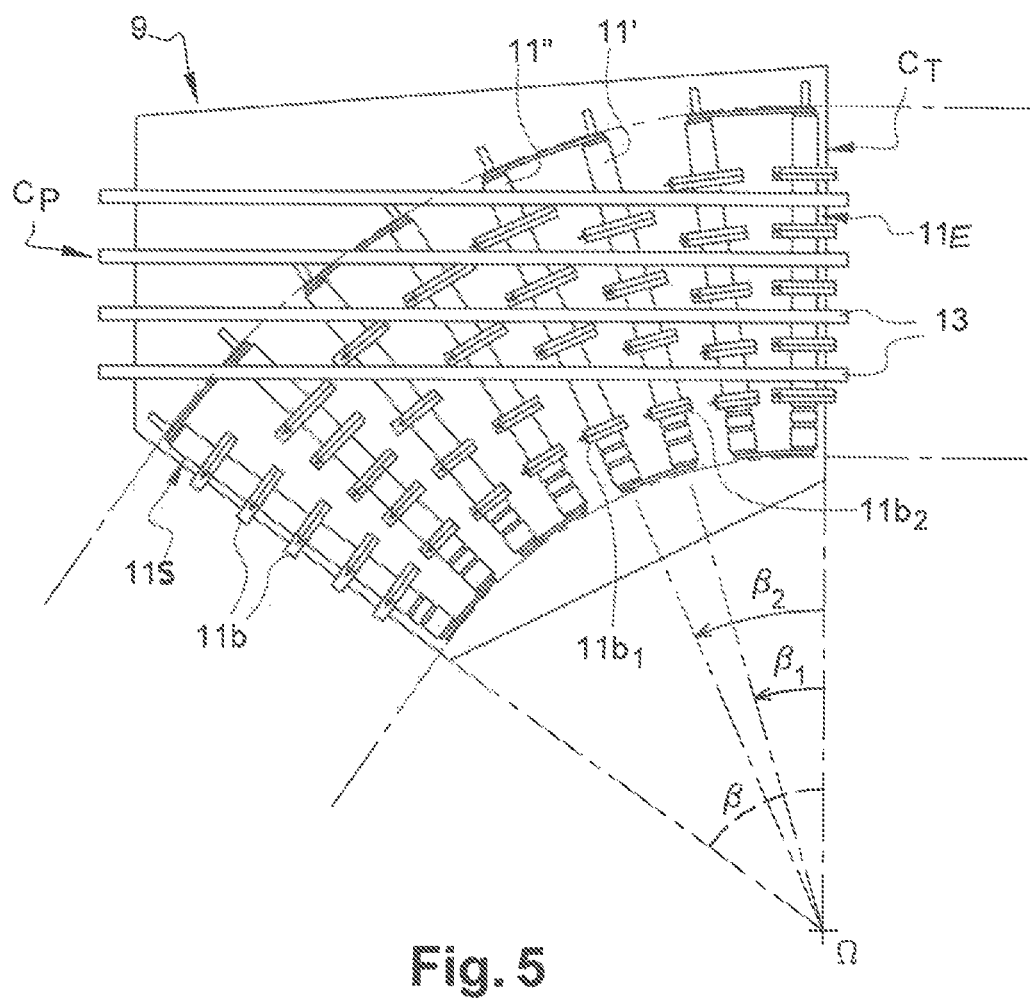
FIG. 5 shows a schematic view, from above, of a transfer device according to a variant of the invention.

More particularly, FIG. 5 shows a schematic top view of a transfer device 9 according to this alternative embodiment. It will be noted that the same references are used hereinafter to designate elements similar to those described in the previous embodiments of FIGS. 1 to 4.

The transfer device 9 comprises, among other things, a plurality of rotary drive elements 11 including a rotary input element 11E and a rotary output element 11S.

Thus, the transfer path $C_T$, defined by a plurality of rotary drive elements 11, has a circular sector of angle β (that is, there is between the axis of the input rotary element and the axis of the output rotary element form an angle β; it should also be noted that the example given is a circular sector but this could be more complex).

Thus, there is a change in the diameter of the rollers 11b determined by the angle between the rotary input element 11E of the transfer path and the angular position of the roller 11b at said transfer path $C_T$.

It will be noted that it is particularly advantageous that the transfer device 9 comprises one or more of the following features:

the input rotary element 11E, that is the element 11 directly downstream of the input conveyor (3 or 7, depending on the use of the transfer device 9), comprises a roll 11a and rollers 11b configured so that the driving speed of the rollers is identical to the speed of the input conveyor (3 or 7);

the rotary output element 11S, that is the element 11 directly upstream of the output conveyor (5 or 7' depending on the use of the transfer device 9), comprises rollers 11b configured so that the driving speed of the rollers is identical to the speed of the output conveyor (5 or 7');

the diameter of the rollers 11b of the rotary elements 11, 11' and 11" changes as a function of the angle β, more particularly for the rollers located outside of an average path, substantially in the middle of the rollers 11a, the diameter of said rollers 11b increases from 0° to β/2, and decreases from β/2 to β. Conversely, for the rollers located inside this middle path, the diameter of said rollers 11b decreases from 0° to β/2, and then increases from β/2 to β.

The rollers of the input rotary element 11E may have a diameter identical to the diameter of the rollers of the output rotary element 11S. This is the case, for example, when the input conveyor has the same speed as the output conveyor. However, in other examples, the diameter of the rollers of the input rotary element may be different from the diameter of the rollers of the output rotary element.

According to the example embodiment in FIG. 5, the angle β is 30°. In other embodiments, the angle β can have values between 0° and 360°, for example 15°, 45°, 60°, 90°, 180°, 270°, etc.

The diameter of the rollers 11b may depend on at least one or two parameters which are the position of the roller 11 with respect to the center of curvature Ω (as previously explained) and/or the angular position β of the roller with respect to the transfer path $C_T$.

Thus, in the alternative embodiment shown in FIG. 5, for a rotary element 11', the diameter of a roller 11b located toward the outside of the transfer path $C_T$ has a larger diameter than a roller 11b located toward the inside of the transfer path $C_T$.

Furthermore, for a rotary element 11" arranged just downstream of the rotary element 11', for rollers, referenced $11b_2$ and $11b_1$ respectively, located at substantially the same distance from the center of curvature Ω, the diameter of the roller $11b_2$ of the element 11" is larger than the diameter of the roller $11b_1$ of the element 11'. This is because the roller $11b_1$ is arranged at an angle $β_1$, the roller $11b2$ is arranged at an angle $β_2$, and $β_1$ is less than $β_2$ (with $β_2$ less than β/2).

Thus, for illustrative purposes, since the diameter of the rollers influences the driving speeds of said rollers, the evolution of the diameters as a function of the angle β and its distance from the center of curvature Ω has been shown by arrows, corresponding to the velocity vector generated by each of the rollers.

The invention claimed is:

1. A device (9) for transferring one or more objects for a conveying installation, said device (9) comprising a main path ($C_P$) for conveying one or more objects and a plurality of rotary drive elements (11), each rotary drive elements (11) being configured to adopt at least two positions:

a lowered position in which said rotary drive element (11) is located below the main conveying path (CP) and does not drive an object;

a raised position in which said rotary drive element (11) projects above the main conveying path (CP) to drive an object;

wherein a rotary drive element (11) has drive surfaces with varying external diameters along the length of said rotary drive element (11), and wherein the plurality of rotary drive elements (11) define a curved transfer path (CT; CT') followed by the object, wherein the drive surfaces of the rotary drive elements (11) have outer diameters varying as a function of an angular position (β) of each rotary drive element (11) on the transfer path ($C_T$; $C_T'$).

2. The device (9) according to claim 1, wherein the external diameter of the rotary element (11) increases according to the distance to the center of curvature (Ω) of said transfer path ($C_T$; $C_T'$).

3. The device (9) according to claim 2, wherein the rotary drive elements (11) pass from a lowered position to a raised position, in succession, the rotary element being in the raised position when the object to be driven is located opposite said element (11).

4. The device (9) according to claim 2, wherein the main conveying path ($C_P$) comprises discrete drive elements.

5. The device (9) according to claim 2, wherein the main conveying path ($C_P$) comprises slides (13) each able to receive a drive belt.

6. The device (9) according to claim 2, wherein one or more rotary drive elements (11) comprise at least one roll (11*a*) and one or more rollers (11*b*) mounted on said roll (11*a*).

7. The device (9) according to claim 1, wherein the rotary drive elements (11) pass from a lowered position to a raised position, in succession, the rotary element being in the raised position when the object to be driven is located opposite said element (11).

8. The device (9) according to claim 7, wherein the main conveying path ($C_P$) comprises discrete drive elements.

9. The device (9) according to claim 7, wherein the main conveying path ($C_P$) comprises slides (13) each able to receive a drive belt.

10. The device (9) according to claim 7, wherein one or more rotary drive elements (11) comprise at least one roll (11*a*) and one or more rollers (11*b*) mounted on said roll (11*a*).

11. The device (9) according to claim 1, wherein the main conveying path ($C_P$) comprises discrete drive elements.

12. The device of claim 11, wherein the discrete drive elements comprise drive belts.

13. The device (9) according to claim 11, wherein the main conveying path ($C_P$) comprises slides (13) each able to receive a drive belt.

14. The device (9) according to claim 11, wherein one or more rotary drive elements (11) comprise at least one roll (11*a*) and one or more rollers (11*b*) mounted on said roll (11*a*).

15. The device (9) according to claim 1, wherein the main conveying path ($C_P$) comprises slides (13) each able to receive a drive belt.

16. The device (9) according to claim 15, wherein said slides (13) are made of a flexible material.

17. The device (9) according to claim 16, wherein one or more rotary drive elements (11) comprise at least one roll (11*a*) and one or more rollers (11*b*) mounted on said roll (11*a*).

18. The device (9) according to claim 15, wherein one or more rotary drive elements (11) comprise at least one roll (11*a*) and one or more rollers (11*b*) mounted on said roll (11*a*).

19. The device (9) according to claim 1, wherein one or more rotary drive elements (11) comprise at least one roll (11*a*) and one or more rollers (11*b*) mounted on said roll (11*a*).

20. An installation (1; 1') for conveying objects, said installation (1; 1') comprising at least two conveyors (3, 5, 7, 7'), a transfer device (9) according to claim 1 for one or more objects, said transfer device (9) being interposed between said at least two conveyors (3, 5, 7, 7') and thus defining at least one main conveying path ($C_P$) and at least one transfer path ($C_T$; $C_T'$).

* * * * *